US011886339B2

(12) United States Patent
Szubbocsev et al.

(10) Patent No.: US 11,886,339 B2
(45) Date of Patent: Jan. 30, 2024

(54) SECURE LOGICAL-TO-PHYSICAL CACHING

(71) Applicant: Micron Technology, Inc., Boise, ID (US)

(72) Inventors: Zoltan Szubbocsev, Santa Clara, CA (US); Alberto Troia, Munich (DE); Federico Tiziani, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/750,989

(22) Filed: May 23, 2022

(65) Prior Publication Data
US 2022/0283940 A1 Sep. 8, 2022

Related U.S. Application Data

(63) Continuation of application No. 16/915,476, filed on Jun. 29, 2020, now Pat. No. 11,341,050, which is a
(Continued)

(51) Int. Cl.
G06F 12/08 (2016.01)
G06F 12/0802 (2016.01)
(Continued)

(52) U.S. Cl.
CPC ...... G06F 12/0802 (2013.01); G06F 12/0246 (2013.01); G06F 12/1009 (2013.01);
(Continued)

(58) Field of Classification Search
CPC ............ G06F 12/0802; G06F 12/0246; G06F 12/1009; G06F 12/1408; G06F 2212/402;
(Continued)

(56) References Cited

U.S. PATENT DOCUMENTS 6,959,382 B1 10/2005 Kinnis et al.
10,303,384 B1 5/2019 Agarwal
(Continued)

FOREIGN PATENT DOCUMENTS

CN 113015975 A 6/2021
JP S621700 A 1/1987
(Continued)

OTHER PUBLICATIONS

"Chinese Application Serial No. 201980043994.6, Voluntary Amendment Filed Oct. 13, 2021", w English Claims, 25 pgs.
(Continued)

Primary Examiner — Hiep T Nguyen
(74) Attorney, Agent, or Firm — Schwegman Lundberg & Woessner, P.A.

(57) ABSTRACT

Various examples are directed to a host device comprising a memory system, a host device memory, and a processor. The processor is programmed to receive from the memory system a first logical-to-physical (L2P) pointer message that comprises a first L2P pointer and a first digital signature. The processor executes a cryptographic operation based at least in part on the first L2P pointer and a cryptographic key and verifies the first digital signature based at least in part on the cryptographic operation. The processor caches the first L2P pointer at the host device memory.

20 Claims, 10 Drawing Sheets

Related U.S. Application Data continuation of application No. 16/023,485, filed on Jun. 29, 2018, now Pat. No. 10,698,816.

(51) Int. Cl.
| | |
|---|---|
| *G06F 12/1009* | (2016.01) |
| *G06F 12/02* | (2006.01) |
| *H04L 9/32* | (2006.01) |
| *H04L 9/08* | (2006.01) |

(52) U.S. Cl.
CPC .......... *H04L 9/0861* (2013.01); *H04L 9/3247* (2013.01); *G06F 2212/402* (2013.01); *G06F 2212/7201* (2013.01)

(58) Field of Classification Search
CPC ..... G06F 2212/7201; G06F 2212/1052; G06F 21/72; G06F 21/62; H04L 9/0861; H04L 9/3247; H04L 9/0894
See application file for complete search history.

(56) References Cited

U.S. PATENT DOCUMENTS

| | | | |
|---|---|---|---|
| 10,698,816 B2 * | 6/2020 | Szubbocsev | H04L 9/0894 |
| 11,341,050 B2 * | 5/2022 | Szubbocsev | H04L 9/0894 |
| 2006/0095388 A1 | 5/2006 | Brown et al. | |
| 2008/0301356 A1 | 12/2008 | La et al. | |
| 2009/0217050 A1 | 8/2009 | Amiel et al. | |
| 2010/0125706 A1 | 5/2010 | Hoeksel et al. | |
| 2010/0274930 A1 | 10/2010 | Thakkar et al. | |
| 2011/0296088 A1 | 12/2011 | Duzly et al. | |
| 2011/0320910 A1 | 12/2011 | Liu et al. | |
| 2012/0278635 A1 | 11/2012 | Hars et al. | |
| 2013/0124794 A1 | 5/2013 | Bux et al. | |
| 2014/0109076 A1 | 4/2014 | Boone et al. | |
| 2014/0281588 A1 | 9/2014 | Vogan et al. | |
| 2016/0363919 A1 | 12/2016 | Anderson | |
| 2017/0075811 A1 | 3/2017 | Hsu et al. | |
| 2017/0177497 A1 | 6/2017 | Chun et al. | |
| 2017/0206030 A1 | 7/2017 | Woo et al. | |
| 2020/0004679 A1 | 1/2020 | Szubbocsev et al. | |
| 2020/0327054 A1 | 10/2020 | Szubbocsev et al. | |

FOREIGN PATENT DOCUMENTS

| | | | |
|---|---|---|---|
| JP | 2002259213 A | 9/2002 | |
| JP | 2007258789 A | 10/2007 | |
| JP | 2016021700 | 2/2016 | |
| KR | 20140100907 A | 8/2014 | |
| WO | WO-2020006485 A1 | 1/2020 | |

OTHER PUBLICATIONS

"European Application Serial No. 19825051.6, Extended European Search Report dated Feb. 16, 2022", 11 pgs.

"European Application Serial No. 19825051.6, Response filed Aug. 9, 2021 to Communication pursuant to Rules 161(2) and 162 EPC dated Feb. 5, 2021", 17 pgs.

"International Application Serial No. PCT/US2019/039938, International Preliminary Report on Patentability dated Jan. 7, 2021", 7 pgs.

"International Application Serial No. PCT/US2019/039938, International Search Report dated Oct. 25, 2019", 3 pgs.

"International Application Serial No. PCT/US2019/039938, Written Opinion dated Oct. 25, 2019", 5 pgs.

"Japanese Application Serial No. 2020-572997, Notification of Reasons for Rejection dated Mar. 29, 2022", W/English Translation, 13 pgs.

"Korean Application Serial No. 10-2021-7002537, Notice of Preliminary Rejection date Mar. 17, 2022", w/ English translation, 10 pgs.

Pass, Rafael, et al., "A Course in Cryptography", (Jan. 31, 2010), 1-204.

"Japanese Application Serial No. 2020-572997, Response filed Jun. 21, 2022 to Notification of Reasons for Rejection dated Mar. 29, 2022", w English claims, 17 pgs.

"Korean Application Serial No. 10-2021-7002537, Response filed Jul. 18, 2022 to Notice of Preliminary Rejection dated Mar. 17, 2022", w English Claims, 22 pgs.

* cited by examiner

SECURE LOGICAL-TO-PHYSICAL CACHING

PRIORITY APPLICATION

This is a continuation of U.S. application Ser. No. 16/915,476, filed Jun. 29, 2020, which is a continuation of U.S. application Ser. No. 16/023,485, filed Jun. 29, 2018, now issued as U.S. Pat. No. 10,698,816, all of which are incorporated herein by reference in their entirety.

BACKGROUND

Memory systems are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory systems typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multilevel cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Some memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory systems, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) may extend adjacent a string of storage cells to form a channel for the storages cells of the string. In the example of a vertical string, the polysilicon structure may be in the form of a vertically extending pillar. In some examples the string may be "folded," and thus arranged relative to a U-shaped pillar. In other examples, multiple vertical structures may be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory systems, including a number of dies or logical units (e.g., logical unit numbers or LUNs), and can include one or more processors or other controllers performing logic functions required to operate the memory systems or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory systems and the host, or erase operations to erase data from the memory systems.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
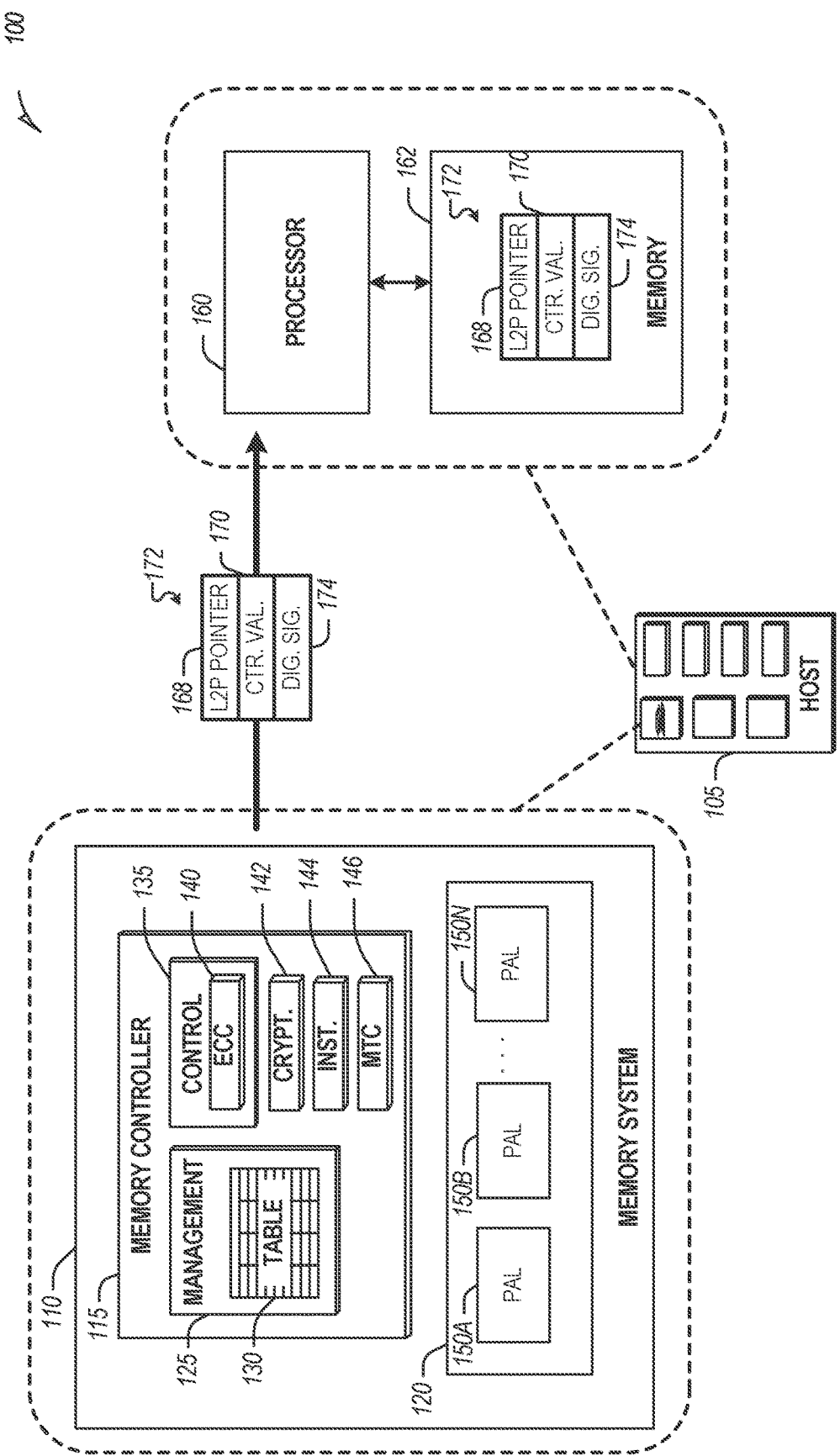
FIG. 1 illustrates an example of an environment including a host device that includes a memory system configured to communicate over a communication interface.

Aspects of the present disclosure are directed to a memory system with secure logical-to-physical (L2P) caching. A memory system can be configured to maintain a set of L2P pointers. An L2P pointer relates a physical address at a memory array of the memory system to a logical address used, for example at the host device. L2P pointers can be stored at the memory system in a common data structure, such as an L2P table. Read and write requests made by the host device can include a logical address associated with a data unit to be read or written. The memory system uses the logical address to generate an L2P pointer and/or access a previously-generated L2P pointer that relates the logical address to one or more physical addresses at the memory array.

To maintain persistence, L2P pointers can be stored at the memory array of a memory system. During use of the memory system, the L2P pointers can be read directly from the memory array. If the memory system controller includes RAM, then some or all of the L2P pointers can be stored at the memory system controller RAM during use to decrease latency. For example, read operations to access L2P pointers at the memory system controller RAM may be faster than read operations to access L2P pointers at the memory array. For some applications, however, the device controller RAM is too small to load a full L2P table for the memory array. Further, some memory system controllers do not include RAM.

Accordingly, in some examples, a memory system is configured to cache some or all of its L2P table including L2P pointers at the host device. The L2P pointers may be stored at a RAM of the host device. When making a read request at a logical address, the host device determines if it has cached a copy of the L2P pointer corresponding to that logical address. If the host device has a cached copy of the L2P pointer, it uses the L2P pointer to resolve the physical address at the memory system that corresponds to the logical address. The host device can make a read request to the memory system using the physical address. The memory system returns the data stored at the physical address. Sometimes, L2P pointer host caching is performed using a protocol, such as the Host Memory Buffer (HMB) protocol implemented using the Non-Volatile Memory Host Controller Interface Specification (NVMHCI) over a Peripheral Component Interconnect Express (PCIe) interface, although other protocols and other interfaces are contemplated.

Caching L2P pointers at the host device can provide certain advantages. For example, it may allow data to be retrieved faster. The host device may be capable of reading an L2P pointer cached at the host device memory faster than the memory system would be able to read the same L2P pointer from the memory array. Also, caching L2P pointers at the host device may reduce the need for RAM at the memory system. For example, when read requests from the host device already include the physical address to be accessed, the demand for caching cache L2P pointers at memory system controller RAM may be reduced.

On the other hand, caching L2P pointers at the host device can expose the physical address structure of the memory system. For example, a malicious actor may attempt a man-in-the-middle attack to intercept L2P pointers sent from the memory system to the host device. The malicious actor may modify intercepted L2P pointers or provide spoofed L2P pointers. In another type of attack, the malicious actor spoofs the memory system and provides the host device with spoofed L2P pointers. The host device caches and then uses the spoofed L2P pointers. This can cause the memory system to appear corrupted. In some examples, the use of spoofed L2P pointers can cause corruption at the memory system.

Various examples described herein address these and/or other challenges by sending L2P pointers from the memory system to the host device along with a digital signature. The memory system can generate the digital signature using the L2P pointer or pointers to be sent to the host device and a cryptographic key. The L2P pointer or pointers and the digital signature are provided to the host device in an L2P pointer message.

The host device also has a copy of the cryptographic key. The host device uses its copy of the cryptographic key to generate a host-side digital signature using the cryptographic key and the L2P pointer or pointers included with the L2P pointer message. Because the host device and the memory system have the same cryptographic key, the digital signature from the L2P pointer message and the host-side digital signature should match. If the digital signatures match, then the host device caches the L2P pointer or pointers at its RAM. If the digital signatures do not match, the host device declines to cache the L2P pointer or pointers at its RAM.

In some examples, the host device is configured to store some or all of the contents of the L2P pointer message at its host device memory upon receiving the L2P pointer message. The digital signature of the L2P pointer message can then be verified after the L2P pointer message contents are stored to RAM. In this way, opportunities to modify the contents of the L2P pointer message are limited. If the host-side digital signature does not match the L2P pointer message digital signature, then the received L2P pointers are removed from the host device memory.

In some examples, the digital signatures are generated using counter values. The memory system can implement a monotonic counter. The monotonic counter is configured to increment upon the occurrence of certain events. For example, the monotonic counter can increment every time that a digital signature is generated for an L2P pointer message. In some examples, the monotonic counter increments upon the occurrence of other events such as, for example, on power-up of the memory system, etc.

The memory system can use values from the monotonic counter to generate the digital signature for an L2P pointer message. For example, the memory system can generate a transaction cryptographic key using the cryptographic key and a current counter value from the monotonic counter. The memory system generates the digital signature using the transaction cryptographic key and provides a clear copy of the counter value with the L2P pointer message. On the host device side, the host device uses the clear copy of the counter value to generate the transaction cryptographic key and uses the transaction cryptographic key to verify the digital signature from the L2P pointer message, as described herein.

Because the monotonic counter is incremented every time that a digital signature is determined, using a counter value in this way can defeat attackers who intercept and attempt to re-send a previous L2P pointer message at a different time. For example, if the host device receives an L2P pointer message having the same monotonic counter value as a previous L2P pointer message, it knows that the message was not correctly generated by the memory system. Further, if the attacker attempts to update the clear counter value in the L2P pointer message, then the digital signature will not match the updated clear counter value and the L2P pointer message will be rejected by the host device.

FIG. 1 illustrates an example of an environment 100 including a host device 105 that includes a memory system 110 configured to communicate over a communication interface. The host device 105 or the memory system 110 may be included in a variety of products, such as Internet of Things (IoT) devices (e.g., a refrigerator or other appliance, sensor, motor or actuator, mobile communication device, automobile, drone, etc.) to support processing, communications, or control of the product.

The memory system 110 includes a memory controller 115 and a memory array 120 including, for example, a number of individual memory systems formed on respective die (in some examples, arranged in, a stack of two-dimensional or three-dimensional (3D) NAND die). In 3D architecture semiconductor memory technology, vertical structures are stacked, increasing the number of tiers, physical pages, and accordingly, the density of a memory system (e.g., a storage device) within a given footprint. In an example, the memory system 110 can be a discrete memory or storage device component of the host device 105. In other examples, the memory system 110 can be a portion of an integrated circuit (e.g., system on a chip (SOC), etc.), stacked or otherwise included with one or more other components of the host device 105.

In the example environment 100 of FIG. 1, the host device 105 includes a processor 160 and host device memory 162. Host device memory 162 may include a random access memory, such as DRAM, SDRAM, or any other suitable volatile or non-volatile memory component. One or more communication interfaces can be used to transfer data between the memory system 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory system 110. In some examples, the host device 105 may be a machine having some portion, or all, of the components discussed with reference to the machine 1000 of FIG. 10. Also, additional examples of host devices 105 are discussed with reference to FIG. 9.

The memory controller 115 can receive instructions from the host device 105, and can communicate with the memory array 120, such as to transfer data to (e.g., write or erase) or from (e.g., read) one or more of the planes, sub-blocks, blocks, or pages of the memory array 120. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host device 105 and the memory system 110. The memory controller 115 can include one or more input/output (I/O) circuits, lines, or interfaces to transfer data to or from the memory array 120. The memory controller 115 can include a memory manager 125 and an array controller 135. Instructions 144 may be executed at the memory controller 115 to implement the secure L2P caching described herein.

The memory manager 125 can include, among other things, circuitry or firmware, such as a number of components or integrated circuits associated with various memory management functions. For purposes of the present description example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory system 110.

The memory manager 125 can include a set of management tables 130 configured to maintain various information associated with one or more component of the memory system 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things.

Management tables 130 can also include one or more L2P tables including L2P pointers relating logical addresses to physical addresses at the memory array 120, as described herein. The management tables 130 are shown at the manager 125. For example, the management tables 130 may be stored at a RAM of the memory controller 115. In some examples, some or all of the management tables 130 are stored at the memory array 120. For example, the manager 125 may read the management tables 130 from the memory array 120 and/or cache some or all of the management tables 130 at RAM of the memory controller 115.

The array controller 135 can include, among other things, circuitry or components configured to control memory operations associated with writing data to, reading data from, or erasing one or more memory cells of the memory system 110 coupled to the memory controller 115. The memory operations can be based on, for example, host commands received from the host device 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory system 110 coupled to the memory controller 115. The memory controller 115 can be configured to actively detect and recover from error occurrences (e.g., bit errors, operation errors, etc.) associated with various operations or storage of data, while maintaining integrity of the data transferred between the host device 105 and the memory system 110, or maintaining integrity of stored data (e.g., using redundant RAID storage, etc.), and can remove (e.g., retire) failing memory resources (e.g., memory cells, memory arrays, pages, blocks, etc.) to prevent future errors.

In the example environment 100 of FIG. 1, the memory controller 115 also includes a cryptographic engine 142. The cryptographic engine 142 can be configured to execute cryptographic operations on data, for example, as described herein. The cryptographic engine 142 may include one or more key registers and one or more math engines. Key registers can store cryptographic keys used to execute cryptographic operations. Although key registers are described as components of the cryptographic engine 142, in some examples, key registers may be positioned elsewhere, for example, a secured location at the memory array 121. The math engine can be configured to perform cryptographic operations, for example, utilizing one or more cryptographic keys stored at a key register.

The cryptographic engine 142 can be configured to execute one or more cryptographic operations to generate digital signatures as described herein. The cryptographic engine 142 can be configured to generate digital signatures using any suitable cryptographic algorithm such as, for example, a cryptographic hash function such as an SHA algorithm (e.g., SHA256), the MD5 algorithm, etc. A cryptographic has function maps an input value to a, usually shorted, hash value. The hash function can be selected such that it is unlikely that two different input values will map to the same hash value. The cryptographic engine 142 can be configured to generate a digital signature by executing a hash function on an input value related to the thing being digitally signed. For example, the cryptographic engine 142 can concatenate a signed command to be executed, a memory system counter value, and a cryptographic key to form an input value. The cryptographic engine 142 can then execute the has function on the input value to generate a digital signature.

In some examples, the cryptographic engine 142 is configured to operate in conjunction with a communication interface between the host device 105 and the memory system 110A. For example, the cryptographic engine 142 may comprise a key register or other suitable storage location for storying a cryptographic key that is used for encrypting and/or generating digital signatures related to communications between the memory system 110A and host device 105, for example, according to the PCIe or other suitable interface. Also, in some examples, the cryptographic engine 142 comprises a key register that stores a server root key. The server root key for a memory system is the cryptographic key used to verify signed commands, as described herein.

The memory array 120 can include several memory cells arranged in, for example, in one or more devices, one or more planes, one or more sub-blocks, one or more blocks, one or more pages, etc. As one example, a 48 GB TLC NAND memory system can include 18,592 bytes (B) of data per page (16,384+2208 bytes), 1536 pages per block, 548 blocks per plane, and 4 or more planes per device. As another example, a 32 GB MLC memory system (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory system. Other examples can include other numbers or arrangements. In some examples, a memory system, or a portion thereof, may be selectively operated in SLC mode, or in a desired MLC mode (such as TLC, QLC, etc.).

The array 120 includes physical address locations 150A, 150B, 150N. A physical address location is a location at the memory array 120 that is uniquely associated with a physical address. In operation, data is typically written to or read from the memory system 110 in pages, and erased in blocks. For example, a physical address location 150A, 150B, 150N may correspond to a page. However, one or more memory operations (e.g., read, write, erase, etc.) can be performed on larger or smaller groups of memory cells, as desired. Accordingly, in some examples, a physical address location 150A, 150B, 150N includes more or less than one page. The data transfer size of a memory system 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data. Storage unit or sub-units for storing metadata, etc. may be referred to as over-provisioned storage units or sub-units.

Different types of memory cells or memory arrays 120 can provide for different page sizes, or may require different amounts of metadata associated therewith. For example, different memory system types may have different bit error rates, which can lead to different amounts of metadata necessary to ensure integrity of the page of data (e.g., a memory system with a higher bit error rate may require more bytes of error correction code data than a memory system with a lower bit error rate). As an example, a multilevel cell (MLC) NAND flash device may have a higher bit error rate than a corresponding single-level cell (SLC) NAND flash device. As such, the MLC device may require more metadata bytes for error data than the corresponding SLC device.

In some examples, the memory controller 115 also comprises a monotonic counter 146. The monotonic counter 146 includes software or hardware for incrementing counter values. The monotonic counter 146 is configured such that the counter values always move in a particular direction. The monotonic counter 146 is configured to increment when a digital signature is generated for an L2P pointer message 172, as described herein. In some examples, the monotonic counter is configured to increment on the occurrence of other events at the memory system 110 such as, for example, when digital signatures are generated for other communications between the memory system 110 and host device 105, when the memory system 110 is powered down or booted up, etc.

The environment 100 of FIG. 1 also illustrates an L2P pointer message 172 comprising an L2P pointer 168 and a digital signature 174. Although the example L2P pointer message 172 includes a single L2P pointer 168, some L2P pointer messages will include multiple L2P pointers in addition to the L2P pointer 168. For example, the L2P pointer message 172 can include an L2P pointer table including some or all of the L2P pointers at a full L2P pointer table stored at the array 120. Optionally, the L2P pointer message 172 also includes a counter value 170.

The memory system 110 generates the digital signature 174, at least in part, using the L2P pointer 168, any other L2P pointers that may be included in the L2P pointer message 172, and a cryptographic key. For example, the memory system 110 may use the cryptographic key to generate a hash of the L2P pointer 168 (and other L2P pointers). The digital signature 174 may include some or all of the result of the hash. Any suitable hash algorithm may be used such as, for example, an SHA algorithm such as SHA256, the MD5 algorithm, etc.

The cryptographic key is a shared secret that is known to the memory system and to the host device. The cryptographic key can be securely communicated between the memory system 110 and the host device 105 in any suitable manner. In some examples, a cryptographic key transfer algorithm, such as a Diffie-Hellman or other suitable key exchange is used. In other examples, the cryptographic key is written to the memory system 110 and/or the host device 105 at or during a manufacturing process. In some examples, the memory system 110 and the host device use a cryptographic key that is already shared between the memory system 110 and host device 105 as part of a communication protocol, such as PCIe.

In some examples, the memory system 110 utilizes an asymmetric key arrangement in which the memory system 110 comprises a public key and a private key. The private key is kept secret and may be stored, for example, at a key register of the cryptographic engine 142. The memory system 110 also has a public key that is shared and may be verified by a certificate authority, a manufacturer of the memory system 110 or host 105, or other suitable party. In examples using an asymmetric key arrangement, the memory system 110 generates the digital signature by encrypting the L2P pointer 168 or pointers with its private key. The host device 105 verifies the digital signature 174 by decrypting the digital signature 174 using the public key. If the result of the decryption matches the L2P pointer 168 or pointers in the L2P pointer message, then the digital signature is verified.

The L2P pointer message 172 is provided to the host device 105. The processor 160 at the host device 105 verifies the digital signature 174 as described herein. If the digital signature 174 is verified, then processor 160 caches the L2P pointer 168 at the RAM 162 of the host device 105.

In some examples, the host device 105 stores the whole L2P pointer message 172 to the RAM 162. To verify the digital signature 174, the processor 160 of the host device 105 reads the L2P pointer message 172 from the RAM 162 to verify the digital signature 174. If the digital signature 174 is not verified, the L2P pointer message 172 is removed from the RAM 162. If the digital signature 174 is verified, the L2P pointer 168 remains stored in the RAM 162, for example, at an L2P cache location at the RAM 162.

Figure 2:
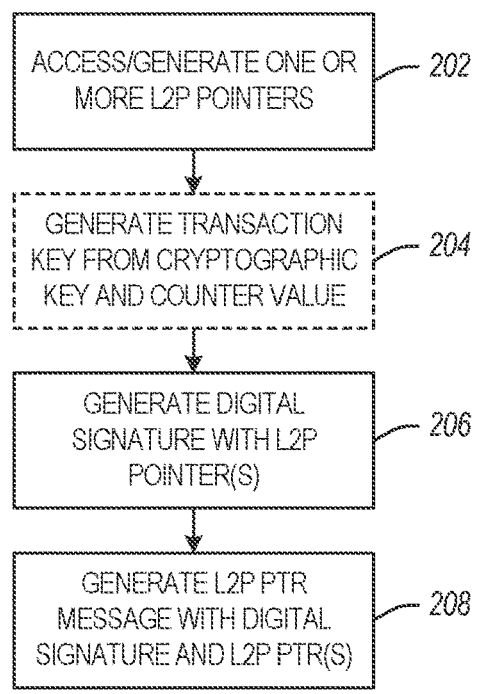
FIG. 2 is a flowchart showing one example of a process flow that may be executed by the memory system to generate a logical-to-physical (L2P) pointer message.

FIG. 2 is a flowchart showing one example of a process flow 200 that may be executed by a memory system, such as the memory system 110, to generate an L2P pointer message. FIG. 2 is described with respect to an L2P pointer message that includes a single L2P pointer. In some examples, however, L2P pointer messages include more than one L2P pointer. For example, an L2P pointer message can include an L2P pointer table including multiple L2P pointers, as described herein.

At operation 202, the memory system accesses and/or generates an L2P pointer. (In examples where an L2P pointer message includes multiple L2P pointers, then memory system accesses and/or generates multiple L2P pointers.) The memory system generates an L2P pointer when it selects a storage unit of the memory array to correspond to a particular logical address. The memory system generates the L2P pointer to relate the logical address to a physical address associated with the selected logical address. Alternatively, the memory system can access a previously-generated L2P pointer stored, for example, at the memory array and/or a RAM of the memory controller.

At optional operation 204, the memory system generates a transaction cryptographic key from the cryptographic key and a current counter value from the monotonic counter. This may be executed in any suitable manner. In some examples, the memory system concatenates the counter value and cryptographic key, using the result at the transaction cryptographic key. In another example, the memory system executes a cryptographic operation, such as a hash operation, using the cryptographic key and the counter value. The result is used as the transaction cryptographic key.

At operation 206, the memory system generates a digital signature using the L2P pointer or pointers from operation 202. This includes executing a cryptographic operation, such as a hash operation, using the L2P pointer and a key. If a transaction cryptographic key is generated from a counter value at operation 204, the digital signature is generated using the transaction cryptographic key. If no transaction cryptographic key is generated, then digital signature is generated using the cryptographic key. In some examples, the digital signature is a keyed-hash message authentication code (HMAC).

At operation 208, the memory system 110 generates the L2P pointer message. The L2P pointer message includes the L2P pointer to be cached at the host 105 and the digital signature generated at operation 206. In examples in which a counter value us used, the L2P pointer message also includes the counter value.

Figure 3:
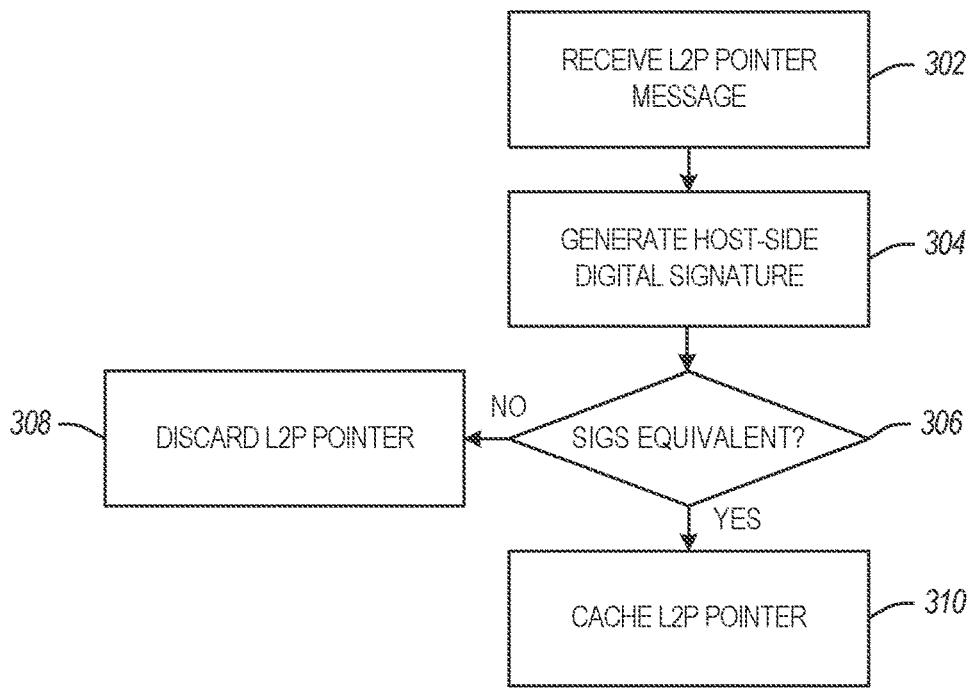
FIG. 3 is a flowchart showing one example of a process flow that may be executed by the host device to verify an L2P pointer message.

FIG. 3 is a flowchart showing one example of a process flow 300 that may be executed by the host device to verify the L2P pointer message. FIG. 3 is described with respect to an L2P pointer message that includes a single L2P pointer. In some examples, however, L2P pointer messages include more than one L2P pointer. For example, an L2P pointer message can include an L2P pointer table including multiple L2P pointers, as described herein.

At operation 302, the host device receives the L2P pointer message. At operation 304, the host device generates a host-side digital signature. The host device can generate the host-side digital signature using the cryptographic key and the L2P pointer included in the L2P pointer message. To generate the host-side digital signature, the host device executes a cryptographic operation using the cryptographic key and the L2P pointer. If multiple L2P pointers are included in the L2P pointer message, then the host-side digital signature may be generated using each L2P pointer in the L2P pointer message.

At operation 306, the host device determines if the host-side digital signature is equivalent to the digital signature from the L2P pointer message. Because the host-side digital signature is to be generated using the same cryptographic key and the same L2P pointer data as the digital signature, it should match the digital signature if the L2P pointer message was correctly and authentically generated by the memory system.

If the host-side digital signature matches the digital signature, the host device caches the L2P pointer at operation 310. On the other hand, if the host-side digital signature does not match the digital signature, the host device discards the L2P pointer or pointers 168 and without caching at operation 308. For example, if the host-side digital signature does not match the digital signature, it may indicate that the L2P pointer message was not generated by the memory system, was not correctly generated by the memory system, and/or has been modified.

Figure 4:
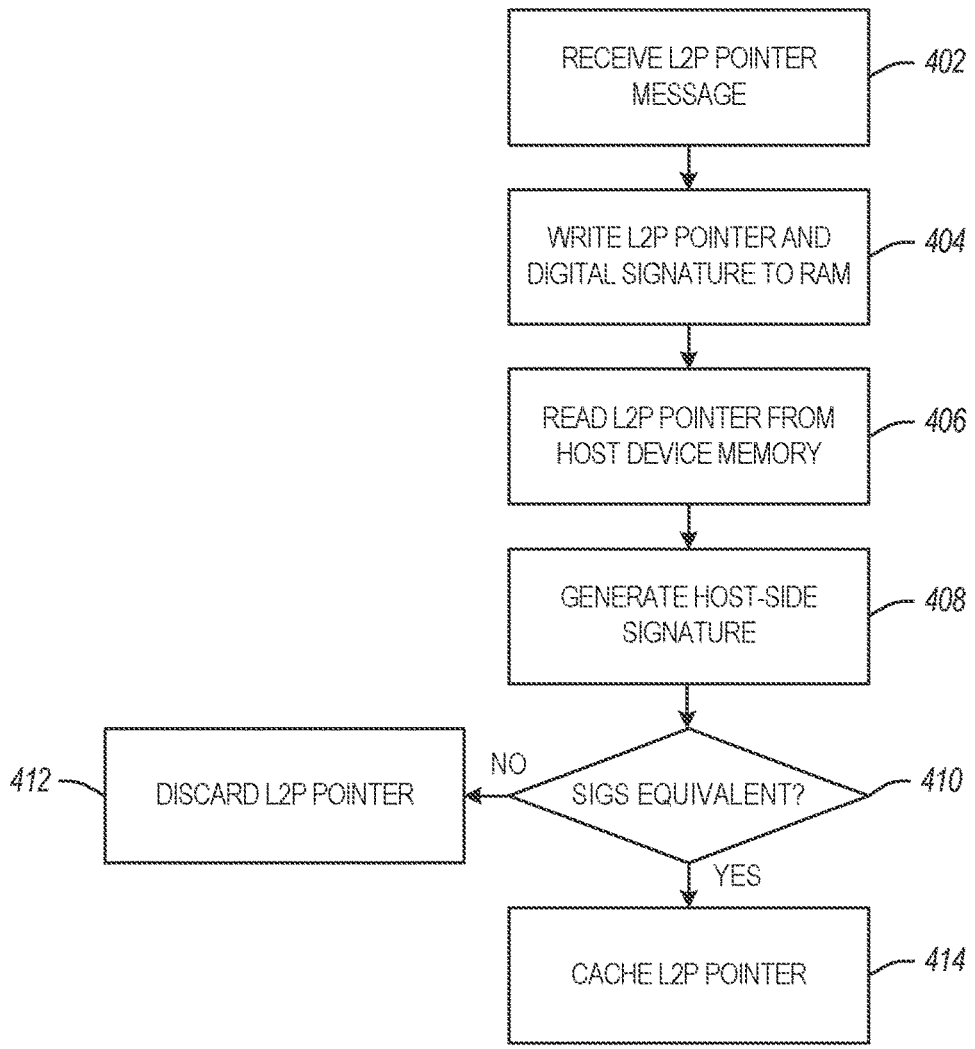
FIG. 4 is a flowchart showing another example of a process flow that may be executed by the host device to verify an L2P pointer message.

FIG. 4 is a flowchart showing another example of a process flow 400 that may be executed by the host device to verify an L2P pointer message. FIG. 4 is described with respect to an L2P pointer message that includes a single L2P pointer. In some examples, however, L2P pointer messages include more than one L2P pointer. For example, an L2P pointer message can include an L2P pointer table including multiple L2P pointers, as described herein.

At operation 402, the host device receives the L2P pointer message. At operation 404, the host device writes the L2P pointer included in the L2P pointer message to RAM, such as the host device memory 162 of FIG. 1. By writing the L2P pointer and digital signature to the host device memory before verifying the digital signature, the host device can minimize the risk that the L2P pointer or the digital signature is corrupted before or during verification of the digital signature.

At operation 406, the host device reads the L2P pointer from the host device memory. At operation 408, the host device generates the host-side signature using the L2P pointer read from the host device memory. The host device also uses the cryptographic key.

At operation 410, the host device determines whether the host-side digital signature is equivalent to the digital signature from the L2P pointer message. If the digital signatures are not equivalent, the host device discards the L2P pointer from the L2P pointer message at operation 412. This may include deleting the L2P pointer from the RAM of the host device. If the digital signatures are equivalent, then the host device caches the L2P pointer at operation 414. In some examples, the L2P pointer is pre-cached at operation 404. If this is the case, then caching the L2P pointer includes leaving the L2P pointer at the location in host device memory where it was stored at operation 404. In other examples, caching the L2P pointer includes moving the L2P pointer from the location at the host device memory where it was stored at operation 404 to a cache location.

Figure 5:
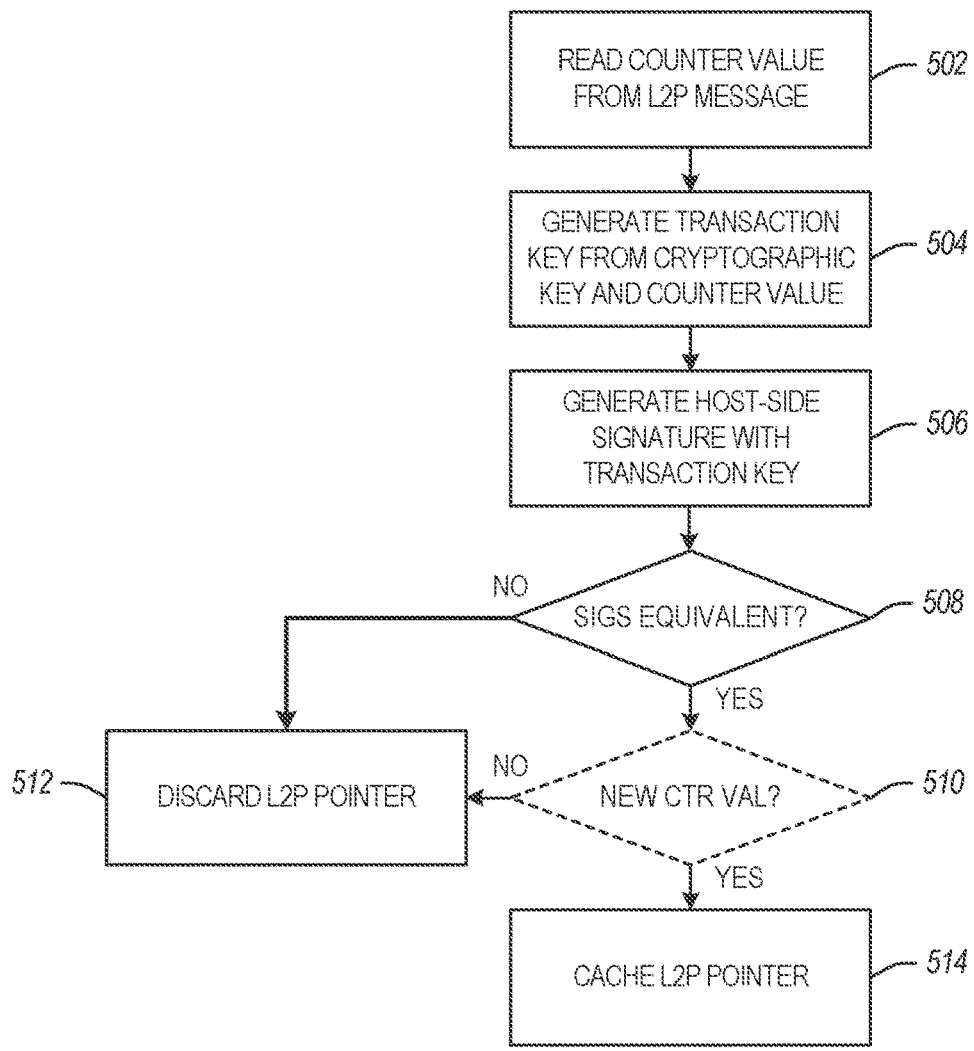
FIG. 5 is a flowchart showing yet another example of a process flow 500 that may be executed by the host device to verify an L2P pointer message.

FIG. 5 is a flowchart showing yet another example of a process flow 500 that may be executed by the host device to verify an L2P pointer message. In the example of FIG. 5, the L2P pointer message includes a counter value from a monotonic counter at the memory system. In the example of FIG. 5, the L2P pointer message includes a counter value from a monotonic counter at the memory system. FIG. 5 is described with respect to an L2P pointer message that includes a single L2P pointer. In some examples, however, L2P pointer messages include more than one L2P pointer. For example, an L2P pointer message can include an L2P pointer table including multiple L2P pointers, as described herein.

At operation 502, the host device receives the L2P pointer message. At operation 504, the host device generates a transaction cryptographic key from the cryptographic key and the counter value. As described herein, the transaction cryptographic key can be generated by concatenating the cryptographic key and counter value, performing a cryptographic operation using the cryptographic key and counter value, etc. At operation 506, the host device generates a host-side digital signature using the transaction cryptographic key and the L2P pointer from the L2P pointer message. For example, the host device may execute a cryptographic operation using the transaction cryptographic key and the L2P pointer.

At operation 508, the host device determines whether the host-side digital signature is equivalent to the digital signature received with the L2P pointer message. If not, the L2P pointer from the L2P pointer message is discarded at operation 512. If the host-side digital signature is equivalent to the digital signature received with the L2P pointer message, the host device caches the L2P pointer at operation 514.

Optionally, before caching the L2P pointer at operation 514, the host device determines, at operation 510, whether the counter value included with the L2P pointer message has been received before. For example, if the counter value has been included with a previous L2P pointer message processed by the host device, it may indicate that the L2P pointer message was not generated with a current counter value from the monotonic counter at the memory system. (The monotonic counter would have incremented after the previous L2P pointer message was generated.) The host device may keep a record of counter values from previous L2P pointer messages received from the memory system. If the counter value in the current L2P pointer message is not new, the host device discards the L2P pointer included with the L2P pointer message at operation 512. If the counter value is new, the host device caches the L2P pointer at operation 514. Although not specifically shown in FIG. 5, in some examples, the process flow 500 can include storing all or part of the L2P pointer message to the RAM of the host device before verifying the digital signature.

Figure 6:
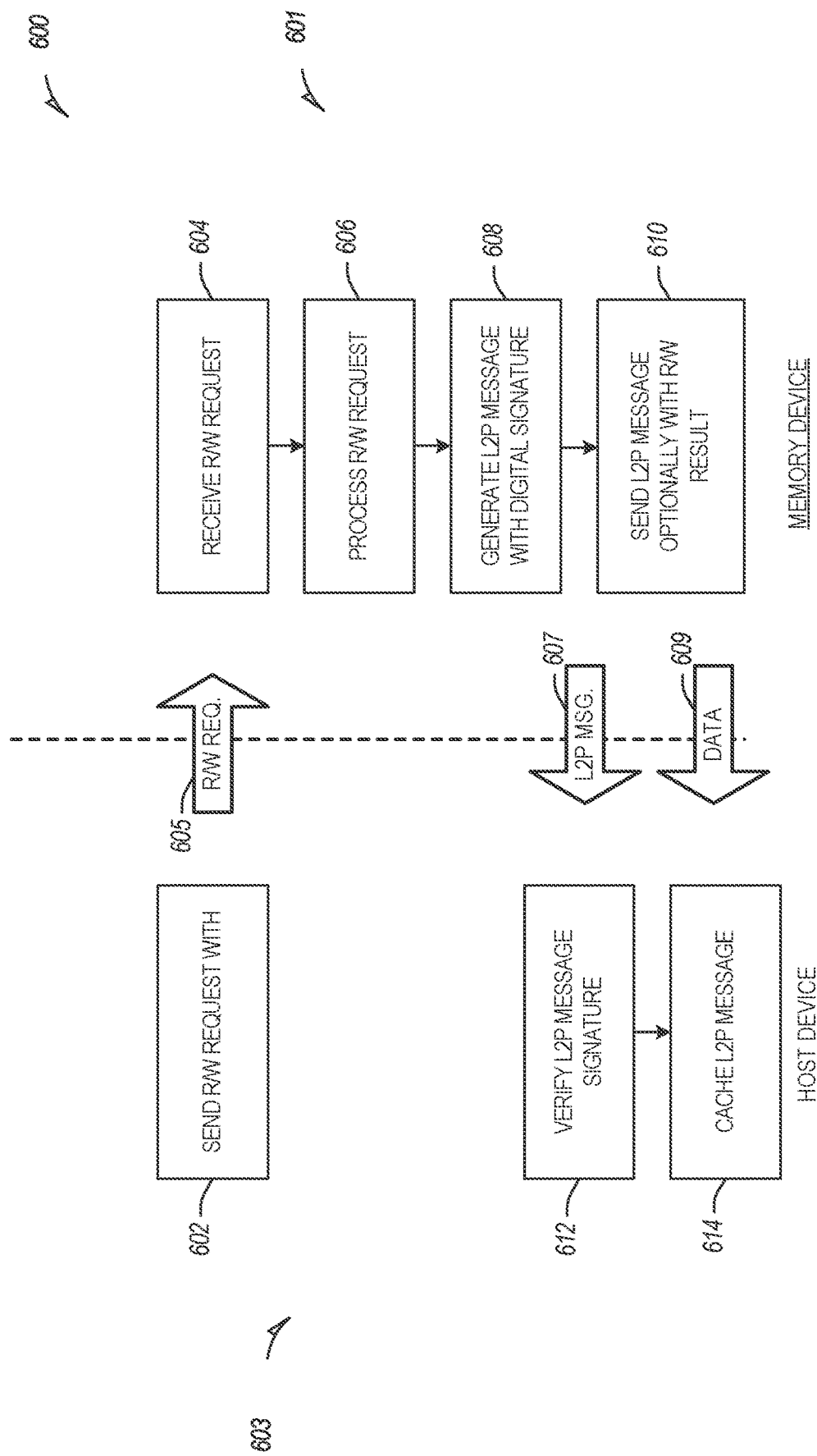
FIG. 6 is a flowchart showing one example of a process flow that may be executed by a memory system and a host device to process a read/write request with secure L2P pointer caching, as described herein.

FIG. 6 is a flowchart showing one example of a process flow 600 that may be executed by a memory system and a host device to process a read/write request with secure L2P pointer caching, as described herein. The process flow 600 includes two columns 601, 603. Column 601 includes operations that are executed by a host, such as the host device 105. Column 603 includes operations that are executed by a memory system, such as the memory system 110.

At operation 602, the host sends a read/write request 605 to the memory system. The read/write request 605 may be a read request or a write request. When the read/write request 605 is a read request, it includes a logical address. The logical address is associated with the physical address of a data unit at the memory system that stores data. When the read/write request 605 is a write request, it includes a logical address and data to be written to a storage unit or storage units of the memory system.

At operation 604, the memory system receives the read/write request 605. At operation 606, the memory system processes the read/write request 605. For example, if the read/write request 605 is a read request, the memory system accesses an L2P pointer relating a logical address included with the read/write request 605 to a physical address. The memory system reads the storage unit corresponding to the physical address and returns the read data to the host device. If the read/write request 605 is a write request, the memory system selects a storage unit or storage units for storing the data included in the write request. The memory system also creates an L2P pointer relating the logical address from the write request to a physical address of the selected storage unit.

At operation 608, the memory system generates an L2P pointer message including a digital signature and the L2P pointer accessed and/or generated at operation 606. For example, the memory system can generate the L2P pointer message, for example, as described herein with respect to FIG. 2.

At operation 610, the memory system sends the L2P message 607 to the host device. Optionally, the memory system also sends data 609 resulting from execution of the read/write request 605. The data 609 may include, for example, data read from the memory array in response to a read request, a confirmation that a write request has been completed, etc.

The host device receives the L2P message 607 and, at operation 612, verifies the digital signature included with the L2P message 607. The host device can verify the digital signature included with the L2P message 607, for example, as described herein with respect to FIGS. 3-5. Provided that the L2P message is verified, the host device caches the L2P pointer included with the L2P pointer message 607 at operation 614.

Figure 7:
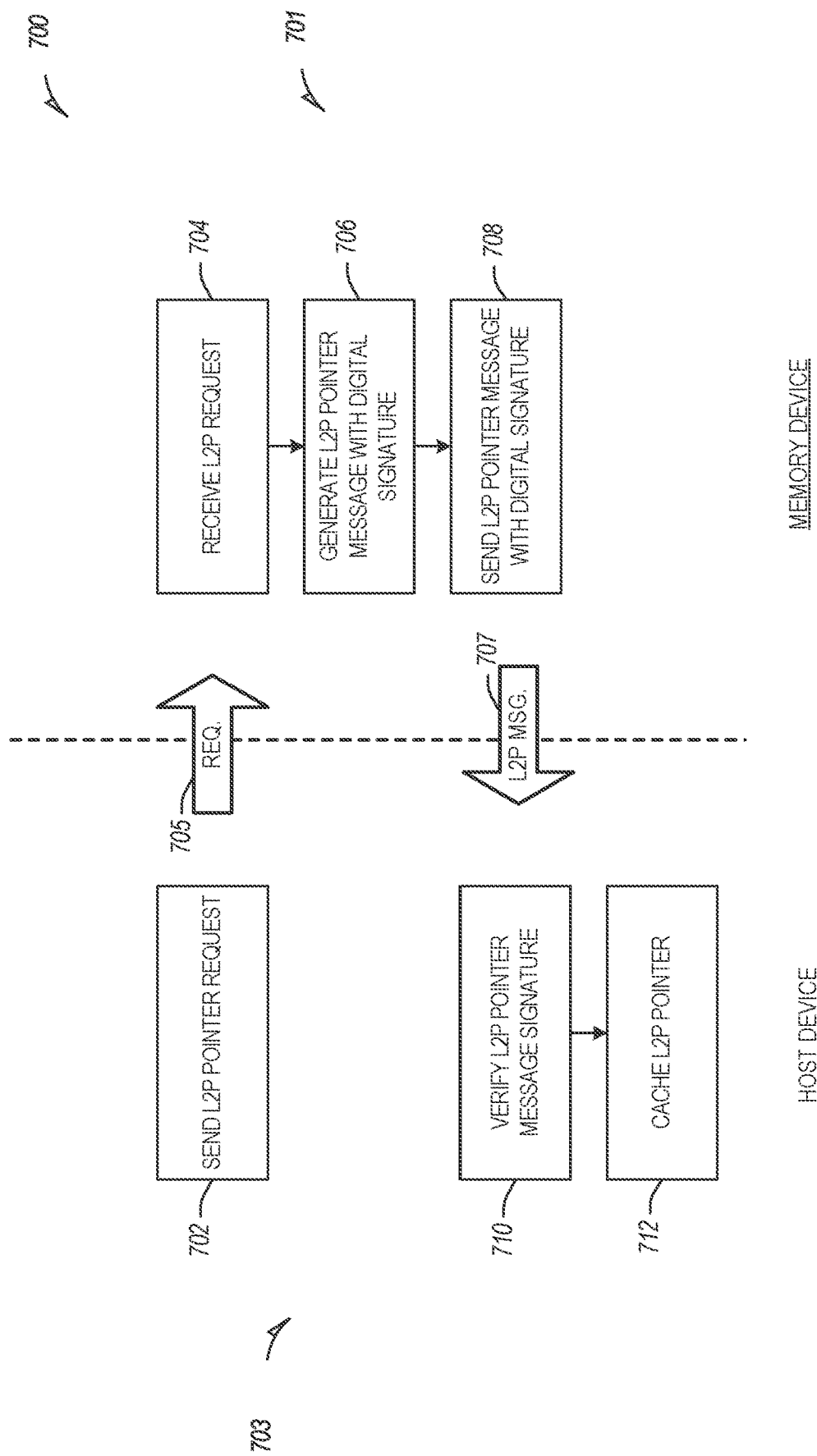
FIG. 7 is a flowchart showing one example of a process flow that may be executed by a memory system and host device to cache a set of one or more of L2P pointers at the host.

FIG. 6 illustrates an example where the memory system provides an L2P pointer message in response to a read/write request. In some examples, the host requests a set of one or more L2P pointers. FIG. 7 is a flowchart showing one example of a process flow 700 that may be executed by a memory system and host device to cache a set of one or more of L2P pointers at the host. The process flow 700 includes two columns 701, 703. Column 701 includes operations that are executed by a host, such as the host device 105. Column 703 includes operations that are executed by a memory system, such as the memory system 110.

At operation 702, the host sends to the memory system a request 705 for a set of L2P pointers. The request 705 may include, for example, a set of logical addresses. The requested set of L2P pointers may include a single L2P pointer and/or a set of L2P pointers.

The memory system receives the request 705 at operation 704. At operation 706, the memory system generates an L2P pointer message 707. For example, the memory system can generate the L2P pointer message as described herein with respect to FIG. 2. At operation 708, the memory system sends the L2P pointer message 707 to the host device.

The host device receives the L2P pointer message 707 and, at operation 710, verifies the L2P pointer message 707. The host device can verify the digital signature included with the L2P pointer message 707, for example, as described herein with respect to FIGS. 3-5. Provided that the digital signature included with the L2P pointer message 707 is verified, the host device caches the L2P pointer or pointers included with the L2P pointer message 707 at operation 712.

Figure 8:
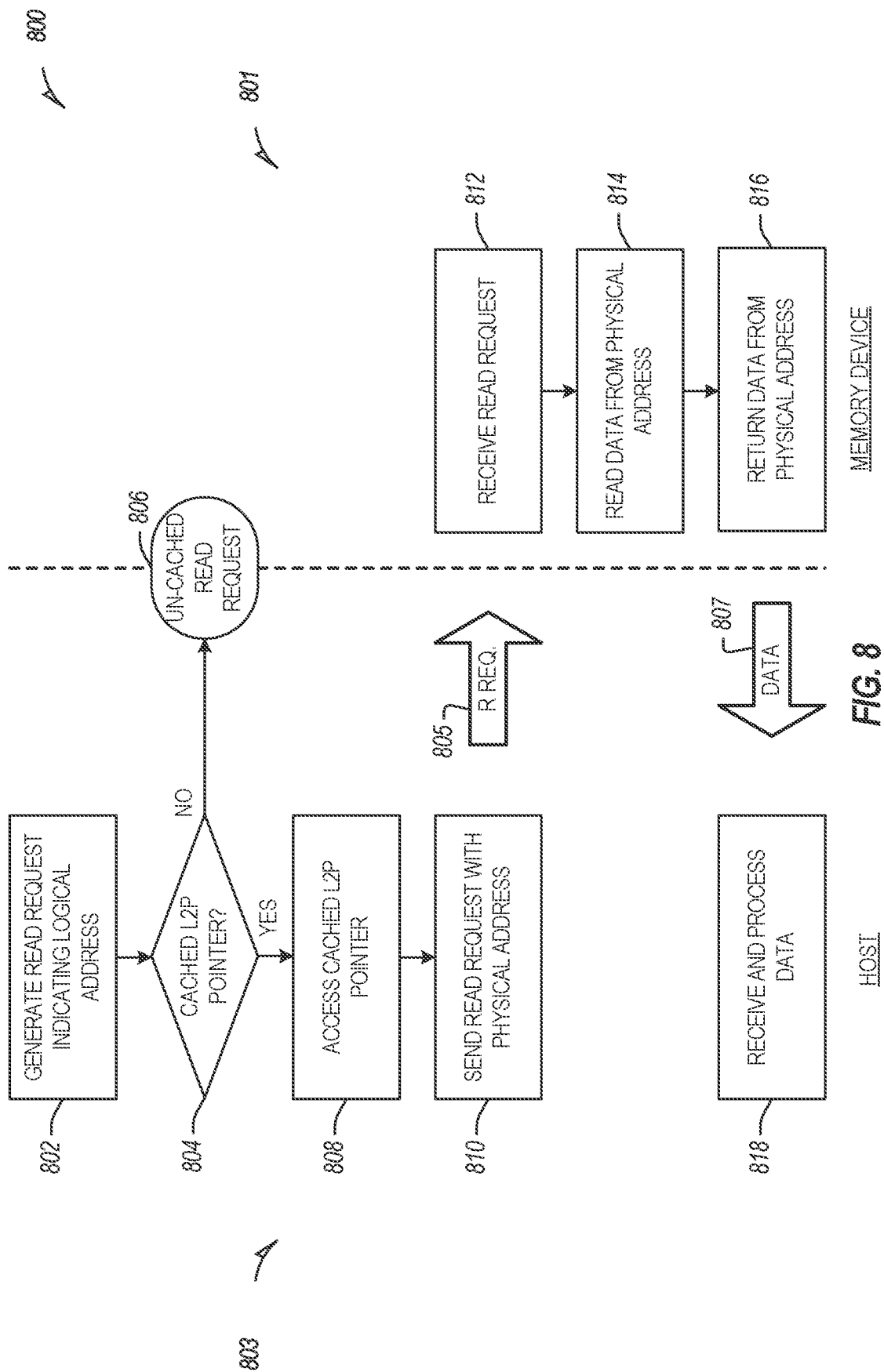
FIG. 8 is a flowchart showing one example of a process flow that may be executed by a memory system and host device to process a read request with L2P pointers cached at the host device.

FIG. 8 is a flowchart showing one example of a process flow 800 that may be executed by a memory system and host device to process a read request with L2P pointers cached at the host device. The process flow 800 includes two columns 801, 803. Column 801 includes operations that are executed by a host, such as the host device 105. Column 803 includes operations that are executed by a memory system, such as the memory system 110.

At operation 802, the host generates a read request indicating a logical address. The read request may be generated by an operating system of the host and/or may be received from an application executing at the host. At operation 804, the host searches one or more L2P pointers cached at the host to determine whether any of the cached L2P pointers indicate the logical address from the read request. If none of the cached L2P pointers indicate the logical address, then the host and memory system execute an un-cached read request routine at operation 806. An example un-cached request routine is described herein with respect to FIG. 6.

If an L2P pointer indicating the logical address is identified at operation 804, then the host, at operation 808, accesses the cached L2P pointer. At operation 810, the host sends to the memory system a read request 805 including the physical address indicated by the L2P pointer.

The memory system receives the read request 805 at operation 812. At operation 814, the memory system reads data from the storage unit corresponding to the physical address included with the read request 805. The memory system returns the data 807 to the host device at operation 816. The host device reads and processes the data at operation 818.

Figure 9:
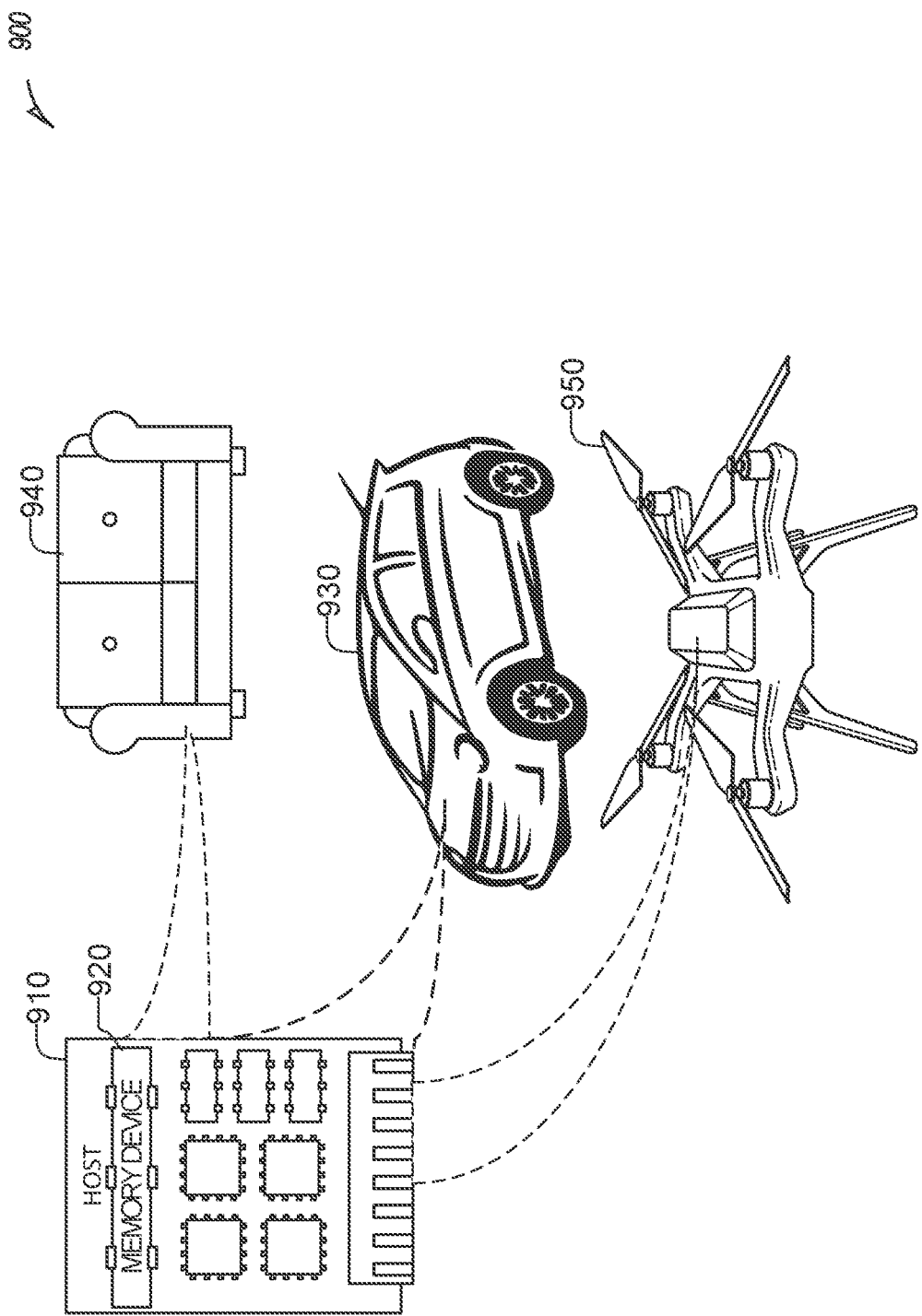
FIG. 9 shows an example host with a memory system as part of one or more apparatuses.

FIG. 9 shows an example host device 910 (e.g., host 105) with a memory system 920 (e.g., any of the memory systems described herein) as part of one or more apparatuses 930-950. Apparatuses include any device that may include a host device, such as host device 910. The host device 910 may be any device capable of executing instructions (sequential or otherwise). Example apparatuses include a vehicle 930 (e.g., as part of an infotainment system, a control system, or the like), a drone 950 (e.g., as part of a control system), furniture or appliances 940 (e.g., as part of a sensor system, an entertainment or infotainment system), or the like. In other examples, although not shown, apparatuses may include aeronautical, marine, Internet of Things (IOT), and other devices.

Figure 10:
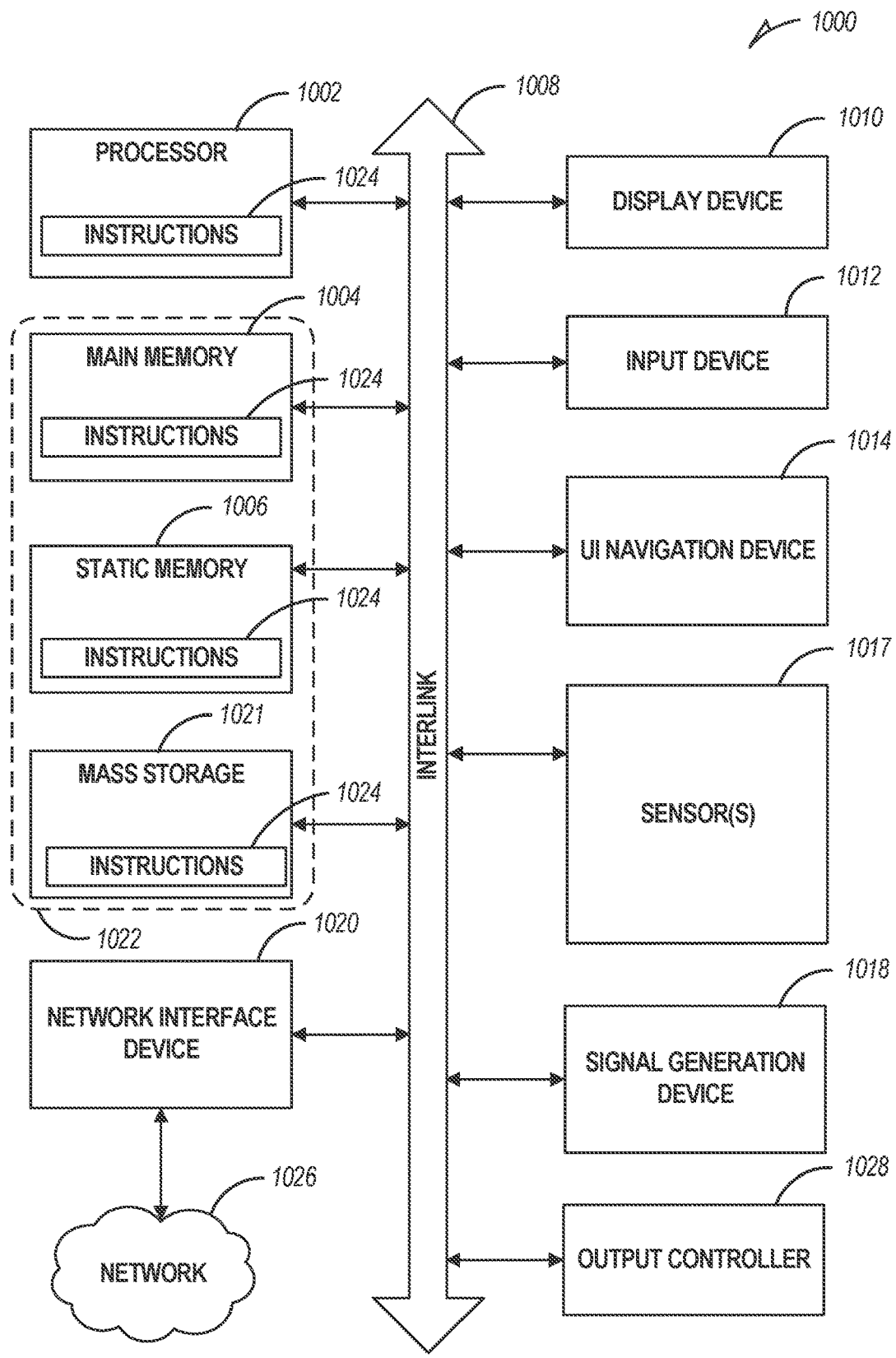
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 1000 (e.g., the host device 105, the memory system 110, etc.) may include a hardware processor 1002 (e.g., a central processing unit (CPU), a graphics processing unit (GPU), a hardware processor core, or any combination thereof, such as the memory controller 115, etc.), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1017, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute the machine readable medium 1022.

While the machine readable medium 1022 is illustrated as a single medium, the term "machine readable medium" may include a single medium or multiple media (e.g., a centralized or distributed database, or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory systems (e.g., Electrically Programmable Read-Only Memory (EPROM), Electrically Erasable Programmable Read-Only Memory (EEPROM)) and flash memory systems; magnetic disks, such as internal hard disks and removable disks; magneto-optical disks; and CD-ROM and DVD-ROM disks.

The instructions 1024 (e.g., software, programs, an operating system (OS), etc.) or other data are stored on the storage device 1021, can be accessed by the memory 1004 for use by the processor 1002. The memory 1004 (e.g., DRAM) is typically fast, but volatile, and thus a different type of storage than the storage device 1021 (e.g., an SSD), which is suitable for long-term storage, including while in an "off" condition. The instructions 1024 or data in use by a user or the machine 1000 are typically loaded in the memory 1004 for use by the processor 1002. When the memory 1004 is full, virtual space from the storage device 1021 can be allocated to supplement the memory 1004; however, because the storage 1021 device is typically slower than the memory 1004, and write speeds are typically at least twice as slow as read speeds, use of virtual memory can greatly reduce user experience due to storage device latency (in contrast to the memory 1004, e.g., DRAM). Further, use of the storage device 1021 for virtual memory can greatly reduce the usable lifespan of the storage device 1021.

In contrast to virtual memory, virtual memory compression (e.g., the Linux® kernel feature "ZRAM") uses part of the memory as compressed block storage to avoid paging to the storage device 1021. Paging takes place in the compressed block until it is necessary to write such data to the storage device 1021. Virtual memory compression increases the usable size of memory 1004, while reducing wear on the storage device 1021.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a source-side select gate (SGS), a control gate (CG), and a drain-side select gate (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory system, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory system as they occur, tracking the operations of the memory system it initiates, evaluating the memory system characteristics corresponding to a wear state, etc.)

According to one or more embodiments of the present disclosure, a memory access device may be configured to provide wear cycle information to the memory system with each memory operation. The memory system control circuitry (e.g., control logic) may be programmed to compensate for memory system performance changes corresponding to the wear cycle information. The memory system may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

EXAMPLES

Example 1 is a system, comprising: a memory system; a host device memory; and a host device processor, wherein the host device processor is programmed to perform operations comprising: receiving from the memory system a first logical-to-physical (L2P) pointer message, the first L2P pointer message comprising: a first L2P pointer indicating a first logical address and a first physical address at the memory system that corresponds to the first logical address; and a first digital signature; executing a first cryptographic operation based at least in part on the first L2P pointer and a cryptographic key; verifying the first digital signature based at least in part on the first cryptographic operation; and caching, by the processor, the first L2P pointer at the host device memory.

In Example 2, the subject matter of Example 1 optionally includes wherein the host device processor is further programmed to perform operations comprising: receiving a second L2P pointer message, the second L2P pointer message comprising: a second L2P pointer indicating a second logical address and a second physical address at the memory system that corresponds to the second logical address; and a second digital signature; executing a second cryptographic operation based at least in part on the second L2P pointer and the cryptographic key; and determining, based at least in part on the second cryptographic operation, that the second digital signature is not verified.

In Example 3, the subject matter of Example 2 optionally includes wherein the host device processor is further programmed to perform operations comprising: before executing the second cryptographic operation, caching, by the processor, the second L2P pointer at the host device memory; reading the second L2P pointer and the second digital signature from the host device memory; and after determining that the second digital signature is not verified, removing the second L2P pointer from the host device memory.

In Example 4, the subject matter of any one or more of Examples 1-3 optionally includes P pointer message further comprises a first counter value and wherein executing the first cryptographic operation is also based at least in part on the first counter value.

In Example 5, the subject matter of Example 4 optionally includes wherein the processor is further programmed to perform operations comprising generating a transaction cryptographic key based at least in part on the cryptographic key and the first counter value, wherein executing the cryptographic key is also based at least in part on the transaction cryptographic key.

In Example 6, the subject matter of any one or more of Examples 4-5 optionally includes P pointer message from the memory system.

In Example 7, the subject matter of any one or more of Examples 1-6 optionally includes P pointers.

In Example 8, the subject matter of any one or more of Examples 1-7 optionally includes wherein the memory system comprises: a memory array; and a controller, wherein the controller is programmed to perform operations comprising: executing a third cryptographic operation based at least in part on a first L2P pointer and a cryptographic key to generate the first digital signature; determining to cache the first L2P pointer at the host device memory; and sending the first L2P pointer message to the processor for storage at the host device memory.

In Example 9, the subject matter of Example 8 optionally includes wherein the memory system further comprises a monotonic counter, and wherein the controller is further programmed to perform operations comprising, reading a first counter value from the monotonic counter, wherein the third cryptographic operation is also based at least in part on the first counter value.

In Example 10, the subject matter of Example 9 optionally includes wherein the controller is further programmed to perform operations comprising generating a transaction cryptographic key based at least in part on the cryptographic key and the first counter value, wherein the third cryptographic operation is also based at least in part on the transaction cryptographic key.

Example 11 is a method of managing a memory system, comprising: receiving, by a processor, a first logical-to-physical (L2P) pointer message originated at a memory system, the first L2P pointer message comprising: a first L2P pointer indicating a first logical address and a first physical address at the memory system that corresponds to the first logical address; and a first digital signature; executing, by the processor, a first cryptographic operation based at least in part on the first L2P pointer and a cryptographic key; verifying, by the processor, the first digital signature based at least in part on the first cryptographic operation; and caching, by the processor, the first L2P pointer at a host device memory associated with the processor.

In Example 12, the subject matter of Example 11 optionally includes receiving, by the processor, a second L2P pointer message, the second L2P pointer message comprising: a second L2P pointer indicating a second logical address and a second physical address at the memory system that corresponds to the second logical address; and a second digital signature; executing, by the processor, a second cryptographic operation based at least in part on the second L2P pointer and the cryptographic key; and determining by the processor, based at least in part on the second cryptographic operation, that the second digital signature is not verified.

In Example 13, the subject matter of Example 12 optionally includes caching, by the processor, the second L2P pointer at the host device memory; and after determining that the second digital signature is not verified, removing the second L2P pointer from the host device memory.

In Example 14, the subject matter of any one or more of Examples 11-13 optionally includes P pointer message further comprises a first counter value and wherein executing the first cryptographic operation is also based at least in part on the first counter value.

In Example 15, the subject matter of Example 14 optionally includes generating a transaction cryptographic key based at least in part on the cryptographic key and the first counter value, wherein executing the cryptographic key is also based at least in part on the transaction cryptographic key.

In Example 16, the subject matter of any one or more of Examples 14-15 optionally includes P pointer message from the memory system.

In Example 17, the subject matter of any one or more of Examples 11-16 optionally includes P pointers.

Example 18 is a tangible computer-readable medium comprising instructions thereon that, when executed by a processor, cause the processor to perform operations comprising: receiving a first logical-to-physical (L2P) pointer message, the first L2P pointer message comprising: a first L2P pointer indicating a first logical address and a first physical address at a memory system that corresponds to the first logical address; and a first digital signature; executing a first cryptographic operation based at least in part on the first L2P pointer and a cryptographic key; verifying the first digital signature based at least in part on the first cryptographic operation; and caching the first L2P pointer at a host device memory associated with the processor.

In Example 19, the subject matter of Example 18 optionally includes wherein the computer readable medium further comprises instructions thereon, that when executed by the processor, causes the processor to perform operations comprising: receiving a second L2P pointer message, the second L2P pointer message comprising: a second L2P pointer indicating a second logical address and a second physical address at the memory system that corresponds to the second logical address; and a second digital signature; executing a second cryptographic operation based at least in part on the second L2P pointer and the cryptographic key; and determining, based at least in part on the second cryptographic operation, that the second digital signature is not verified.

In Example 20, the subject matter of Example 19 optionally includes wherein the computer readable medium further comprises instructions thereon, that when executed by the processor, causes the processor to perform operations comprising: caching, by the processor, the second L2P pointer at the host device memory; and after determining that the second digital signature is not verified, removing the second L2P pointer from the host device memory.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A system comprising:
a first device; and
a second device, the second device being programmed to perform operations comprising:
receiving, from the first device, a first message, the first message comprising:
first data describing a first logical address at the first device and a first physical address at the first device, the first physical address at the first device corresponding to the first logical address at the first device; and
first cryptographic data;
executing a first cryptographic operation based at least in part on the first data and a cryptographic key;
verifying the first cryptographic data based at least in part on the first cryptographic operation; and
caching, by the second device, the first data at a memory of the second device.

2. The system of claim 1, wherein the second device is also programmed to perform operations comprising:
receiving a second message, the second message comprising:
second data describing a second logical address at the first device and a second physical address at the first device, the second physical address at the first device corresponding to the second logical address at the first device; and
second cryptographic data;
executing a second cryptographic operation based at least in part on the second data and the cryptographic key; and
determining, based at least in part on the second cryptographic operation, that the second cryptographic data is not verified.

3. The system of claim 2, wherein the second device is also programmed to perform operations comprising:
before executing the second cryptographic operation, caching the second data at a memory of the second device;
reading the second data from the memory of the second device; and
after determining that the second cryptographic data is not verified, removing the second data from the memory of the second device.

4. The system of claim 1, wherein the first message further comprises a first counter value and wherein executing the first cryptographic operation is also based at least in part on the first counter value.

5. The system of claim 4, wherein the second device is also programmed to perform operations comprising generating a transaction cryptographic key based at least in part on the cryptographic key and the first counter value, wherein executing the first cryptographic operation is also based at least in part on the transaction cryptographic key.

6. The system of claim 4, wherein the second device is also programmed to perform operations comprising determining that the first counter value has not been used in a previous message from the second device.

7. The system of claim 1, wherein the first message further comprises second data describing a second logical address at the first device and a second physical address at the first device, the second physical address at the first device corresponding to the second logical address at the first device, and wherein executing the first cryptographic operation is also based at least in part on the second data.

8. The system of claim 1, wherein the first device comprises a memory array, and the first device being programmed to perform operations comprising:
executing a second cryptographic operation based at least in part on a first data and a second cryptographic key to generate the first cryptographic data;
determining to cache the first data at the second device; and
sending the first message to the second device.

9. The system of claim 8, wherein the first device further comprises a monotonic counter, the first device being further programmed to perform operations comprising reading a first counter value from the monotonic counter, the second cryptographic operation also being based at least in part on the first counter value.

10. The system of claim 9, wherein the first device is further programmed to perform operations comprising generating a transaction cryptographic key based at least in part on the second cryptographic key and the first counter value, wherein the second cryptographic operation is also based at least in part on the transaction cryptographic key.

11. A method for caching data from a first device at a second device, the method comprising:
receiving, by the second device, a first message from the first device, the first message comprising:
first data describing a first logical address at the first device and a first physical address at the first device, the first physical address at the first device corresponding to the first logical address at the first device; and
first cryptographic data;
executing, by the second device, a first cryptographic operation based at least in part on the first data and a cryptographic key;
verifying the first cryptographic data, by the second device, the verifying based at least in part on the first cryptographic operation; and
caching the first data at a memory of the second device.

12. The method of claim 11, further comprising:
receiving, by the second device, a second message, the second message comprising:
second data describing a second logical address at the first device and a second physical address at the first device, the second physical address at the first device corresponding to the second logical address at the first device; and
second cryptographic data;
executing, by the second device, a second cryptographic operation based at least in part on the second data and the cryptographic key; and
determining, by the second device, that the second cryptographic data is not verified, the determining that the second cryptographic data is not verified being based at least in part on the second cryptographic operation.

13. The method of claim 12, further comprising:
before executing the second cryptographic operation, caching the second data at a memory of the second device;
reading the second data from the memory of the second device; and after determining that the second cryptographic data is not verified, removing the second data from the memory of the second device.

14. The method of claim 11, wherein the first message further comprises a first counter value and wherein executing the first cryptographic operation is also based at least in part on the first counter value.

15. The method of claim 14, further comprising generating, by the second device, a transaction cryptographic key based at least in part on the cryptographic key and the first counter value, wherein executing the first cryptographic operation is also based at least in part on the transaction cryptographic key.

16. The method of claim 14, further comprising determining, by the second device, that the first counter value has not been used in a previous message from the second device.

17. The method of claim 11, wherein the first message further comprises second data describing a second logical address at the first device and a second physical address at the first device, the second physical address at the first device corresponding to the second logical address at the first device, and wherein executing the first cryptographic operation is also based at least in part on the second data.

18. The method of claim 11, wherein the first device comprises a memory array, and the first device being programmed to perform operations comprising:
  executing, by the first device, a second cryptographic operation based at least in part on a first data and a second cryptographic key to generate the first cryptographic data;
  determining, by the first device, to cache the first data at the second device; and
  sending, by the first device, the first message to the second device.

19. The method of claim 18, wherein the first device further comprises a monotonic counter, the method further comprising reading, by the first device, a first counter value from the monotonic counter, the second cryptographic operation also being based at least in part on the first counter value.

20. A non-transitory computer-readable medium comprising instructions thereon that, when executed by at least one of a first device or a second device, cause the first device or the second device to perform operations comprising:
  receiving, by the second device, a first message from the first device, the first message comprising:
    first data describing a first logical address at the first device and a first physical address at the first device, the first physical address at the first device corresponding to the first logical address at the first device; and
    first cryptographic data;
  executing, by the second device, a first cryptographic operation based at least in part on the first data and a cryptographic key;
  verifying the first cryptographic data, by the second device, the verifying based at least in part on the first cryptographic operation; and
  caching the first data at a memory of the second device.

* * * * *